2,729,255

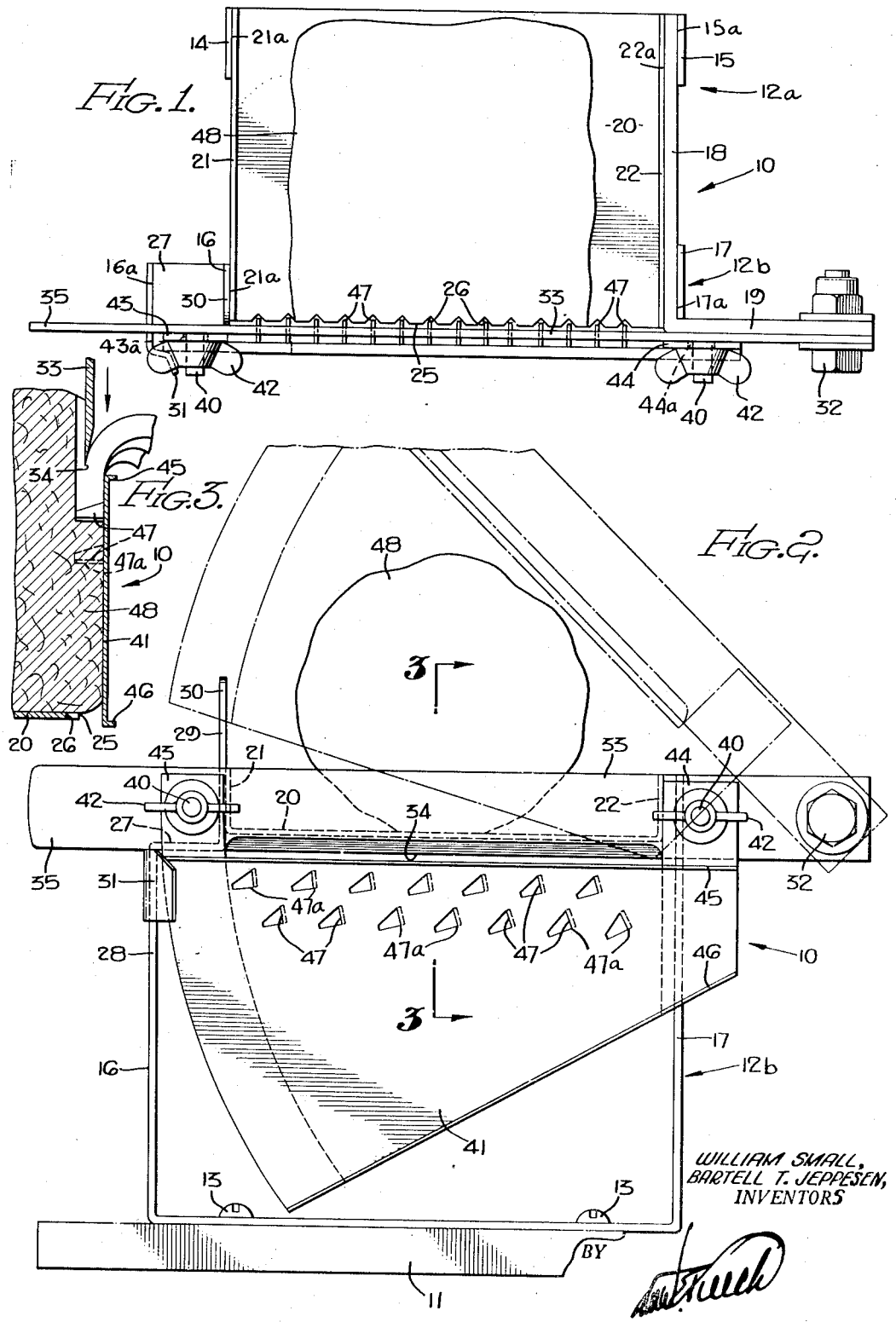

VEGETABLE CUTTER AND SHREDDER

William Small and Bartell T. Jeppesen, Lynwood, Calif.

Application April 26, 1954, Serial No. 425,347

1 Claim. (Cl. 146—78)

This invention relates to devices used in kitchens for cutting up vegetables in preparing these for salads or cooking.

It is a particular object of the invention to provide such a device which may be inexpensively produced, and which is adapted for shredding lettuce or cabbage or other leafy vegetables and for slicing potatoes in one operation into either "French fry" or "shoestring" form.

It is another object to provide such a device having a single slicing knife which may be used independently for slicing vegetables or other foods, and having a shredding means which, when associated with said knife, shreds the food to be sliced by said knife immediately in advance of the slicing operation.

It is a still further object to provide a vegetable cutter in which the shredding means may be quickly removed, if desired, or replaced by an alternate shredding means, to effect a change in the size of the particles into which the vegetable is divided.

The manner of accomplishing the foregoing objects as well as further objects and advantages will be made manifest in the following description taken in connection with the accompanying drawings in which Fig. 1 is a diagrammatic plan view of a preferred embodiment of the invention.

Fig. 2 is a front elevational view of Fig. 1 showing the cutting knife and shredding means in full lines in lowered position and in broken lines in raised position.

Fig. 3 is a fragmentary cross sectional operational view taken on the line 3—3 of Fig. 2.

Referring specifically to the drawings, the vegetable cutter 10 of the invention shown therein includes a base 11, which may be of wood, and U-shaped brackets 12a and 12b secured to base 11 by screws 13 to provide legs 14, 15, 16 and 17.

Upper ends of legs 15 and 17 are united by spot welds 15a and 17a to a bar 18 having an arm 19 bent at a right angle outwardly from its front end. Supported on legs 14, 15, 16 and 17 at their upper ends is a table 20 having upturned side flanges 21 and 22 which are spot-welded by welds 21a and 22a respectively to arms 14 and 16 and to bar 18. The front edge 25 of table 20 has notches 26, the purpose of which will be made clear hereinafter.

The leg 16 has a step portion 27, just below the level of the table 20, and a lower vertical portion 28 and upper vertical portion 29. The latter portion of leg 16 extends upwardly above the table flange 21 welded thereto and has a rounded front edge 30 for guiding purposes as will be made clear hereinafter.

Spotwelded at 16a on the upper end of lower leg portion 28 of leg 16 is a knife stop and guide 31.

Pivotally mounted by bolt 32 on the outer end of arm 19 is a cutting knife 33. This knife has a sharp cutting edge 34 along its lower edge portion disposed opposite table 20, and a handle 35 at its free end which comes to rest on stop guide 31 with said knife in horizontal position and with cutting edge 34 parallel with and slightly below table 20.

Permanently fixed on knife 33 is a pair of horizontal parallel threaded studs 40 by which a vegetable guide plate 41 is removably secured to knife 33 by wing nuts 42. The guide plate 41 is segment shaped and formed of a light guage stainless steel, and is strengthened by opposite side edge backing bars 43 and 44, upper extremities of which extend above plate 41 and are provided with apertures 43a and 44a which fit over studs 40 beneath nuts 42. Stiffening flanges 45 and 46 are bent forwardly from upper and lower edges of plate 41.

Instruck from vegetable guide plate 41 are slitting blades 47. Each of these is preferably formed normal to a radius from the pivot bolt 32. These blades are arranged in two parallel rows, the blades in each row being in staggered relation to the blades in the other row.

The lower edges 47a of blades 47 are sharpened so as to form equally spaced slits in a front layer of potato or other vegetable 48 resting on table 20 and against plate 41 when knife 33 is swung downward from its broken line position in Fig. 2 to full line position therein.

The layer of vegetable thus slit along arcuate concentric equidistant lines is sliced off the vegetable by the knife 33 as it follows the blades 47 downwardly (Fig. 3).

Thus a potato may be quickly reduced to raw shoestring size or a leafy vegetable or onion may be reduced to a shredded mass.

A plurality of vegetable guide plates 41 are preferably provided with different length blades 47, with different spacings of these blades and with the plate 41 spaced different distances horizontally from the knife 33. A guide plate with about half as many blades 47 and with said blades spaced twice the distances shown in the drawing, and with plate 41 spaced twice as far horizontally from knife 33, may be provided for substitution for the guide plate 41 shown, to produce strips of potato of the proper size to make "French fries."

When the knife 33 and guide plate 41 are reciprocated about pivot bolt 32, the left edge of the plate 41 and backing plate 43 slide within the guide 31 thereby keeping said plate from bending out of perpendicular relation with its pivotal axis during vegetable cutting operations.

It is a decided advantage of the present invention to be able to quickly remove the vegetable guide plate 41 by loosening wing nuts 42, either to permit the knife 33 to be employed in a single slicing operation, or to replace plate 41 with a different guide plate such as the one above described for making "French fries."

A vegetable 48 is diagrammatically represented in the drawings as resting on the table 20 and pressed towards the knife 33 and guide plate 41 as when operating the vegetable cutter 10.

The claim is:

In a vegetable cutter, the combination of: a vegetable supporting table; an arm mounted on said table; a straight, flat bar providing a knife, said knife being pivotally mounted on the extremity of said arm on an axis close to and substantially parallel with said table so that said knife sweeps close to and parallel with an edge of said table when rotated about said axis, said knife having a cutting edge facing downward and co-extensive with said table, the portion of said knife disposed outwardly from said edge forming a handle; a pair of threaded studs provided on said knife to extend therefrom in parallel horizontal relation adjacent opposite ends of said cutting edge; a vegetable guide plate disposed parallel to said knife and having backing bars at its opposite side edges which extend upward to form apertured attaching lugs which fit over said studs, thereby permitting said guide plate to be removably mounted on said studs by a pair of wing nuts; slitting blades outstruck inwardly from said vegetable guide plate, said blades being arranged in spaced rows with the blades of each row in staggered relation to adjacent blades of the other row, and a guide stop on said table overlying and guiding said plate and providing a down limit stop for said handle.

References Cited in the file of this patent

UNITED STATES PATENTS

| | | |
|---|---|---|
| 1,430,289 | Dahmer | Sept. 26, 1922 |
| 1,432,892 | Nielsen | Oct. 24, 1922 |
| 2,114,428 | Mesterton | Apr. 19, 1938 |
| 2,484,281 | Gardner | Oct. 11, 1949 |

FOREIGN PATENTS

| | | |
|---|---|---|
| 670,925 | Great Britain | Apr. 30, 1952 |